Dec. 1, 1959
E. S. CORNISH
2,915,697
METHOD AND APPARATUS FOR ELECTRICAL
LOGGING OF BORE HOLES
Filed April 11, 1957
3 Sheets-Sheet 1
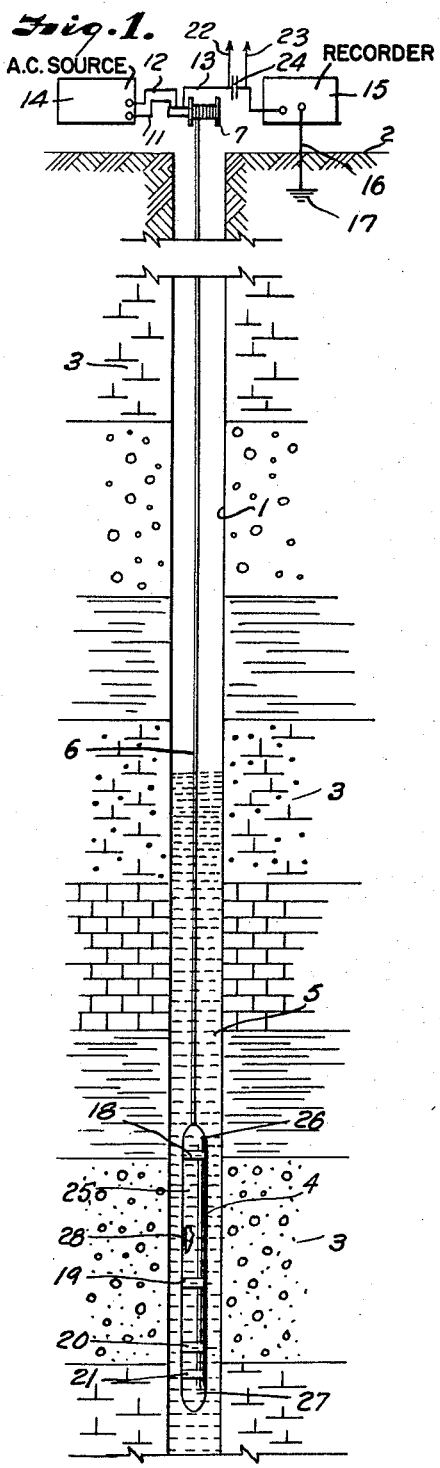
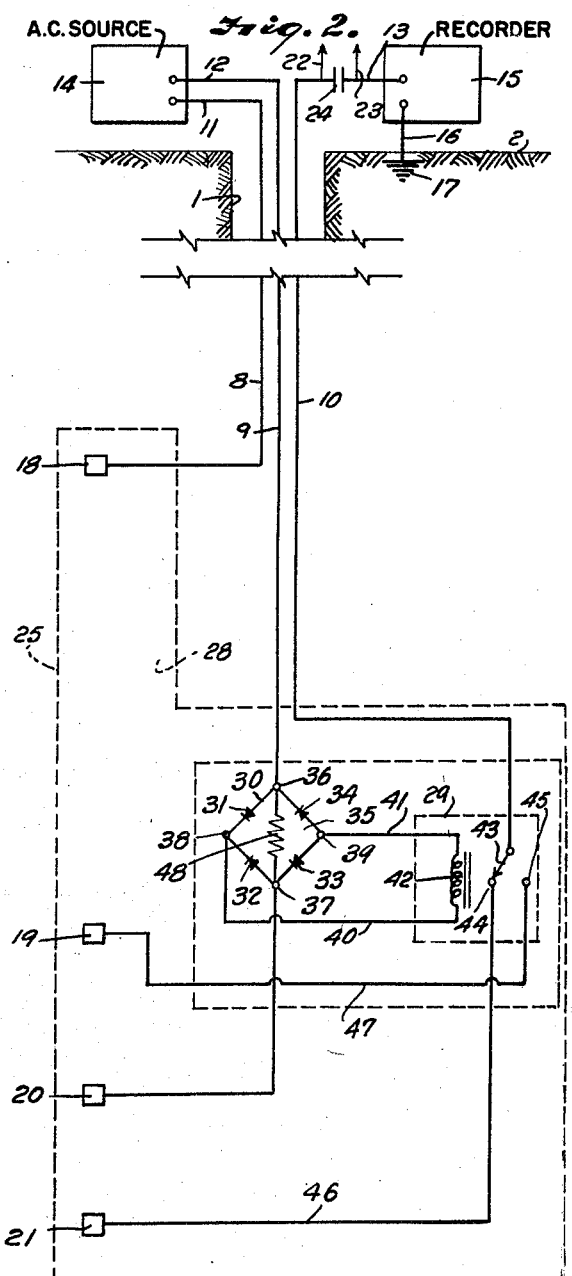
INVENTOR.
Eugene S. Cornish
BY
Paul E. Mullendore
ATTORNEY

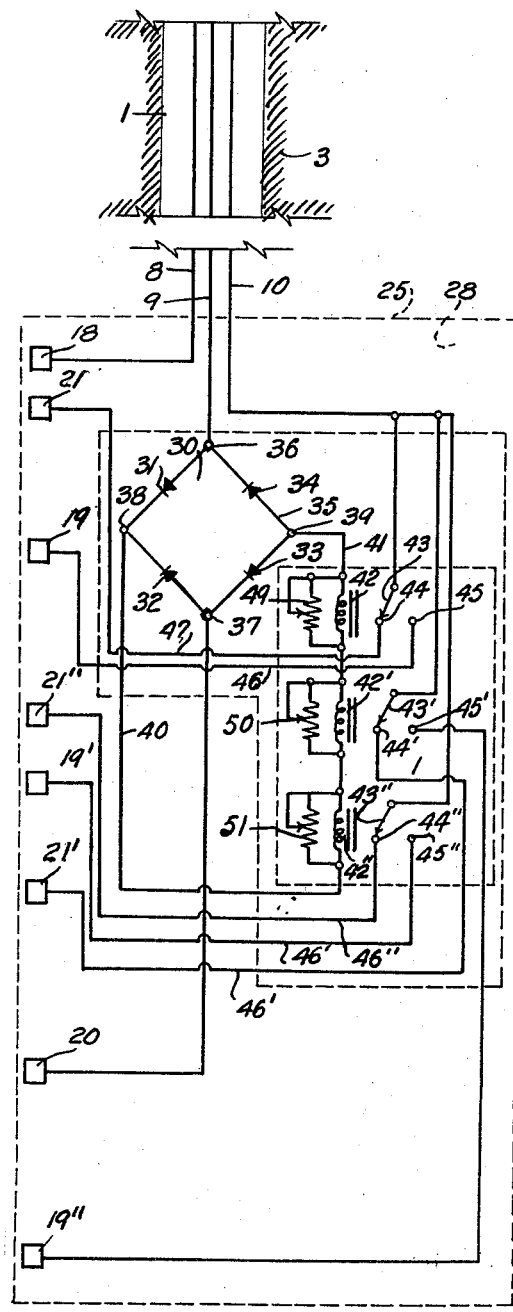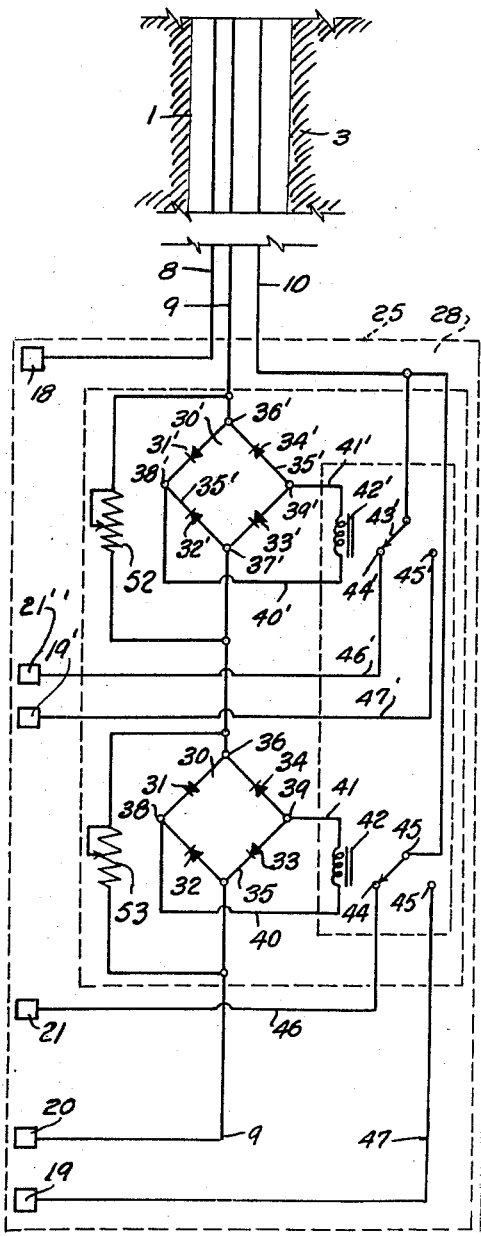

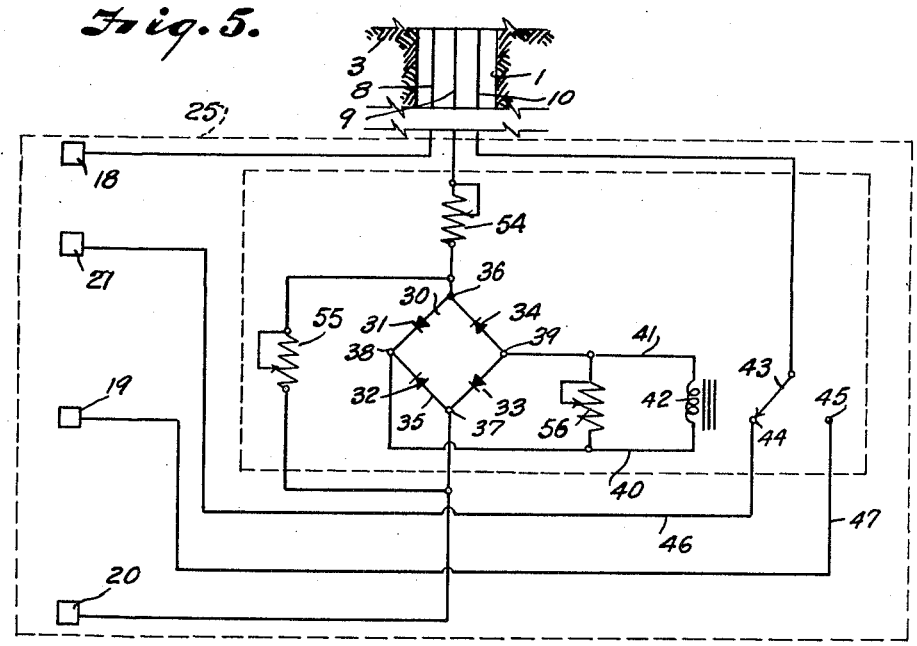
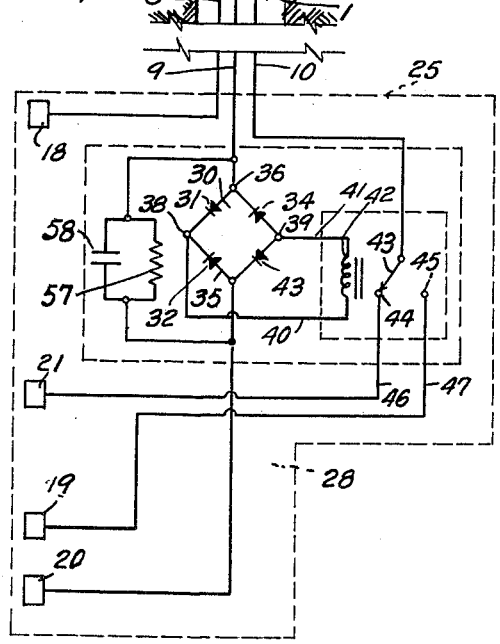
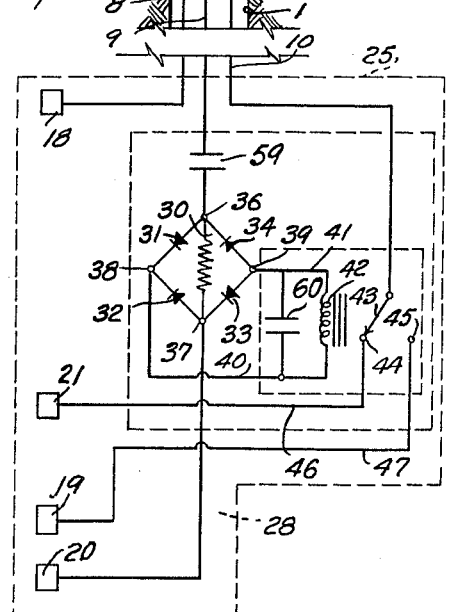

United States Patent Office 2,915,697
Patented Dec. 1, 1959

2,915,697

METHOD AND APPARATUS FOR ELECTRICAL LOGGING OF BORE HOLES

Eugene S. Cornish, Enid, Okla., assignor to George E. Failing Company, Enid, Okla., a corporation of Delaware Application April 11, 1957, Serial No. 652,220

8 Claims. (Cl. 324—1)

The invention relates to a method and apparatus for electrical logging of earth formations surrounding a bore hole.

In electrical logging, various methods of instrumentation and circuit systems may be necessary to obtain the desired information concerning the earth formations and conditions existing within the bore hole. Consequently, this would ordinarily necessitate numerous conductors for carrying the exciting and signal currents, but due to the fact that the recording equipment must be above ground and the sensing elements deep within the bore hole, often up to three, or perhaps more, miles apart, transmission of the necessary currents is a problem, in that the relatively small diameter and extreme depth of the bore hole limits, for practical reasons, the number of conductors that can be included in a cable to connect a sensing or electrode tool with the current sources and the various recording instruments.

The solution, prior to the present invention, is to utilize an electrode or sensing tool having an arrangement of electrodes to accomplish the measurements within the capacity of the number of conductors that are practicable, usually three, then, when other circuit systems are required, to remove that tool from the bore hole and substitute another tool having the proper connections, or to change the circuitry in the original tool. It is obvious that the running in and out of the different tools results in delays and loss of time, both of which are costly factors.

It has been proposed prior to the present invention to provide a sensing or electrode tool with an arrangement of electrodes and to provide within the tool one or more relay circuits adapted to be operated from the top of the bore hole by a current transmitted through the conductor or conductors which ordinarily supply the exciting current, but here again, the type of current, the relatively small diameter of the bore hole, and the extreme depth thereof, would not allow for sufficiently small and compact relay and switching mechanisms to permit housing them within the sensing or electrode tool.

Therefore, the principal objects of the present invention are to overcome these difficulties by providing, in combination with the customary logging circuits, a relay and switching mechanism operable directly by the exciting current source used when obtaining the desired information, and by providing a sensing or electrode tool with all the electrodes that may be necesary and to provide relay and switching mechanisms for making the desired connections that are small enough and sufficiently compact to be contained within the tool.

Other objects of the invention are to provide, in combination with a logging circuit and sensing tool connected therewith, a plurality of relay and switch circuits adapted to be selectively energized by the exciting current responsive to adjustment of the voltage levels of the exciting current in accordance with the voltage at which the relay circuits are set to operate; to provide relays adapted to be energized by change in frequency of the exciting current; to provide for series and parallel connection of the relay circuit with other of the measuring circuits with which the exciting circuit is associated; and to provide for blocking any direct currents that may cause adverse effects in the relay circuit.

In accomplishing these and other objects of the invention, as hereinafter pointed out, I have provided improved methods and apparatus for practicing the present invention, the preferred forms of which are illustrated in the accompanying drawings, wherein:

Fig. 1 is a diagrammatic sectional view of a bore hole extending from the earth's surface through the various earth formations which are electrically logged by electrical logging apparatus embodying the present invention and adapted to be operated in accordance with my improved method to obtain the different records using a cable having a minimum of conductors.

Fig. 2 is a diagram showing more specifically the circuitry involved in the apparatus illustrated in Fig. 1, and particularly showing the relay contained within the sensing or electrode to establish different electrical connections of the electrodes and which is adapted to be operated from a position on the earth's surface by the exciting current used in obtaining the desired information.

Fig. 3 is a diagrammatic view similar to Fig. 2, but depicting a sensing or electrode tool having a greater number of electrodes and which are adapted for connection in different circuit systems through a plurality of relays all adapted to be contained within the tool and selectively energized by adjusting the voltage of the exciting current from the top of the bore hole.

Fig. 4 is a similar view of another method of selectively operating relay circuits responsive to different voltage levels in the exciting current.

Fig. 5 is a diagrammatic view of the electrode circuits in the sensing tool and showing different locations at which the resistance element used in effecting flow of current in the relay circuit may be connected.

Fig. 6 is a diagrammatic view illustrating substantially the same circuitry as illustrated in Fig. 2, but showing control of the relay circuit responsive to frequency change of the exciting current.

Fig. 7 is a diagrammatic view similar to Fig. 2, but showing capacitors for blocking direct currents that may cause adverse effects in operation of the relay circuit.

Referring more in detail to the drawings:

1 designates a bore hole that has been drilled from the earth surface 2 through various formations as indicated at 3, as in prospecting for oil and gas. Such bore holes are being drilled to greater and greater depths, and bore holes of two, three, or more miles in depth are becoming common. Due to the great cost of drilling and casing deep holes, relatively small drill bits are used, and particularly in drilling the lower formations.

In drilling bore holes of this character, it is desirable to know the thickness, depth, content, porosity, et cetera, of the different formations, so as to locate and identify the formations through which the bore hole extends, and to provide a log comparable with corresponding logs of other bore holes in various localities to study the formations.

In electrical logging, the characteristics of earth formations are determinable by measurement of electrical resistance and direct current potential (spontaneous potential) associated therewith, and these two electrical quantities are readily determined and recorded in the form of graphs or curves versus bore hole depth. Such graphs are referred to as "electric logs" and analysis thereof leads to data concerning the formations. The potential curves of the log are measurements of the electrical potential between a fixed point at the surface of the earth and a movable point in the bore hole. The potential variations between these two points are recorded versus depth in the form of a graph as the movable point is lowered in the bore hole.

The electrical resistances of the earth formations are primarily a function of the water or metallic ore contents of the formations, obtained by passing an A.C. current therethrough, which is recorded in the form of a resistivity curve or graph progressively with lowering of the movable point in the bore hole.

The movable point or points are electrodes carried by a sensing or logging tool 4 that is lowered through the liquid 5 within the bore hole by means of an armored cable 6. The cable 6 is adapted to be unwound from and wound upon a reel 7 for lowering and raising the tool 4 in the bore hole. The cable 6 contains three conductors 8, 9 and 10 which connect through suitable rings and brushes with conductors 11, 12 and 13, the conductors 11 and 12 being connected with a source 14 of an alternating current, and the conductor 13 is connected with a recorder 15 having a ground conductor 16 connected with a ground electrode 17 that forms the fixed point previously mentioned.

In Fig. 1, the tool 4 is equipped with four electrodes 18, 19, 20 and 21. Certain of the electrodes consist of current electrodes 18 and 20, and others potential or pickup electrodes 19 and 21. The current electrodes 18 and 20 normally supply a constant current to excite or energize the formations, and the voltage across the potential or pickup electrodes is measured and expressed in terms of resistance, and a resistivity curve or graph is obtained by means of the recorder 15. The exciting current is a low frequency A.C. current, to minimize skin and radiation effects.

First referring to Fig. 2, an A.C. current at a constant uniform level, for example, a value below 18 milliamperes, is supplied from the source 14. The flow is through the conductors 11 and 8 to the electrode 18 and between the electrodes 18 and 21, through the earth formations 3 and ground electrode 17, through the conductor 16, recording instrument 15, conductors 13 and 10, to the tool electrode 21. A resistivity curve or graph, known to those skilled in the art as the "short normal," is obtained progressively with lowering of the tool in the bore hole. The direct current or spontaneous potential of the formations, above referred to, is passed to a recording instrument (not shown) by way of the conductors 22 and 23 that are connected to the conductor 13, a blocking condenser 24 being inserted in the conductor 13 between the conductors 22 and 23 to prevent direct currents from passing to the recorder 15. Simultaneously, a flow of current takes place through the electrode 20 and conductors 9 and 12 to complete the exciting circuit through the electrode tool by way of the current conductive capacity of the well fluid. It is obvious that this current flow is at a low level.

When making an electrical log of a bore hole, it may be desirable to obtain a "long normal" resistivity curve, or other types of curves may be desired. These require changes in circuit systems through a different arrangement of the electrodes. Consequently, as above stated, it becomes necessary to remove the tool from the bore hole for change in the hookup of the electrical connections with the electrodes, or another electrode having the different arrangement of electrodes must be substituted, after which the substitute or modified tool is rerun into the bore hole. It may happen that the new tool may not give the desired results, in which case the tool is lifted to the top of the bore hole and replaced with another tool. All of these proceedings require time and make electrical logs expensive.

It is for this reason that the present invention provides the electrode tool with electrode 19 in addition to the electrode 21, and the tool contains electrical equipment to change from one electrode to the other, according to the will of the loggers, without withdrawing the tool from the bore hole. While the present Fig. 1 shows the electrodes 19 and 21, it is to be understood that the tool may be equipped with a greater number of pickup electrodes and be connected remotely into the circuitry as desired.

The electrode tool comprises an elongated cylindrical shell 25, having the electrodes 18, 19, 20 and 21 spaced along the length thereof and electrically insulated from each other. The ends of the shell are closed by heads 26 and 27 to form a fluid tight compartment 28 within the shell. The electrodes 18 and 20 are connected with the conductors 8 and 9 and the conductors 19 and 21 are adapted to be alternately interconnected with the conductor 10 by means of a relay switch 29 that is contained in the compartment 28 and adapted to be energized by a direct current resulting from rectification of the A.C. current supplied by way of the electrodes 18 and 20, and which is rendered responsive to adjustment of the A.C. current source 14.

It is obvious that the shell 25 must be of smaller diameter than the bore hole 1, so that it hangs from the cable in spaced relation with the wall of the bore hole. It is stated above that the diameter of the bore hole is relatively small, and, consequently, the shell is of small diameter and yet it must contain a rectifier, relay, and switch mechanisms necessary to render the electrodes 19 and 21 alternately effective by the logging crew at the top of the bore hole.

In carrying out this portion of the invention, the rectifier circuit 30 includes rectifiers 31, 32, 33 and 34 connected in the form of a bridge 35. The current supply terminals 36 and 37 are connected into the conductor 9 and the side or current offtake terminals 38 and 39 are connected with leads 40 and 41 of the coil of an electromagnet 42, the armature of which constitutes the switch arm 43 of a relay switch 29. The switch arm 43 is connected with the conductor 10, and is adapted to engage a contact 44 or a contact 45. The contact 44 is connected with the electrode 21 through a conductor 46, and the contact 45 is connected with the electrode 19 by means of a conductor 47. It is found that "Sylvania" type rectifiers "IN 34 A" are sufficiently small and can be easily contained within the compartment within the shell. The rectifiers are matched to obtain a minimum distortion of the alternating current voltage applied at the input terminals of the bridge. Also, the "Sigma" type relay "2 2R TC-200" is a small, highly sensitive relay adapted to operate properly on currents of low value, and can be easily contained in the shell in longitudinal relation with the bridge rectifier. The normal path of the A.C. current is by way of a resistor 48 that interconnects the end terminals 36 and 37. The resistor may be of the variable type or a resistor having a fixed value. It is to be understood that the specification of a specific rectifier and relay switch is merely to identify type, as other suitable and sensitive devices are produced by other manufacturers.

In order to render the bridge circuit effective in furnishing a direct current to the electromagnet, the level of the A.C. current source is increased above the 18 milliampere value above mentioned, so that current is bypassed through the rectifiers to establish a direct current in the electromagnet 42 of the relay and effect movement of the switch arm 43 into engagement with the contact 45, whereupon the circuit to the electrode 8 is interrupted and established to the electrode 19 to obtain the "long normal" resistivity curve without requiring removal of the electrode tool from the bore hole. The current system may be readily restored for obtaining a "short normal" resistivity curve by lowering the level of the A.C. current source until the relay is deenergized. If a greater number of pickup electrodes are to be used, the relay switch may be used that is provided with a number of poles suitable to give the electrode connections that may be desired. For example, a double pole double throw switch may be substituted for the single pole double throw switch which is illustrated if another electrode is to be added to the tool.

Fig. 3 shows a wiring diagram of an electrode tool having a greater number and a different spacing arrangement of the electrodes to give different types of recordings for evaluating the formations through which the bore hole is drilled. In addition to the electrodes 18, 19 and 20, the electrode tool has the electrodes 19', 19'', 21' and 21''. Therefore, two relay switches designated 42' and 42'' are shown in addition to the relay switch 42. The relay switches 42, 42' and 43' are selectively operated to alternately control flow of current to the electrodes 19 or 21, 19' or 21', and 19'' or 21''. The construction and arrangement of the relay circuits are identical with that for the relay switch 42, and, therefore, primes and double primes have been used with corresponding numerals to designate the parts in the additional relay circuits which are identical with the parts described in connection with the circuits for the relay 42.

The selection of a desired relay switch operation is effected by resistance elements 49, 50 and 51 that are connected in parallel with the windings of the relay switches 42, 42' and 42'', respectively. The resistance elements 49, 50 and 51 are selected or are each adjustable to adjust sensitivity of the electromagnets of the relay switches, whereby the switches may be selectively and individually operated by voltages applied from the current source 14.

The form of the invention shown in Fig. 4 includes a plurality of bridge circuits designated 35 and 35' for connection in series and adapted for supplying a low voltage direct current to the relay switches 42 and 42'. In this instance, the sensitivity of the rectified current is under control of resistance elements 52 and 53 that are connected in parallel with the respective bridge circuits 35 and 35'.

The form of invention shown in Fig. 5 shows different arrangements of the resistors, for example, a resistor 54 might be connected in series with the bridge circuit, or a resistor 55 might be connected in parallel with the bridge circuit, or a resistor 56 might be connected across the output terminals 38 and 39 of the bridge circuit. When the resistor 54 or the resistor 55 is used to adjust the magnitude of the alternating current applied at the terminals 36 and 37 to actuate the relay, the relay 42 is selectively controlled by the current supplied through the conductors 8 and 9. When the resistance 55 is used, it reduces the resistance of the A.C. relay circuit for series applications as shown in Fig. 3 and decreases distortion caused by the rectifiers. When the resistance 56 is used, it increases the resistance of the A.C. relay circuit for parallel applications as shown in Fig. 5.

The form of invention illustrated in Fig. 6 shows the resistance element 57 and a condenser connected in parallel with the bridge circuit. The resistance 57 and capacitor 58 form an anti-resonant circuit causing a high shunt impedance to be in parallel with the rectifier and at a band of frequencies about the anti-resonant frequency of the circuit, thereby shunting the A.C. current through the rectifier circuit, causing the relay to be actuated. At frequencies above or below this band, the capacitor and resistor provide a low impedance path around the relay circuit, thereby shunting the current away from the relay circuit and preventing it from operating. If desired, the condenser and resistor may be placed in series as a shunt path around the rectifier circuit, thereby causing the relay to become inoperative at a particular band of frequencies and operative at frequencies above or below that band.

Fig. 7 shows a capacitor 59 in series with the bridge circuit to block any direct current that may cause adverse effects, also a capacitor 60 may be used across the relay to prevent possible chatter and keep alternating current from flowing through the coil of the relay switch. The capacitor 60 may also be used to alter the speed of operation of the relay.

Assuming that the electrode tool 4 is suspended within a bore hole 1, and that a recording is being made, utilizing the electrodes 18, 19 and 21, the current is kept at a sufficiently low value to avoid sensitizing of the electromagnet of the relay switch 29. Assuming that it becomes desirable to utilize the electrode 19, it is only necessary to increase the voltage of the current supplied to the electrodes 18 and 20, and the bridge rectifier then becomes effective in supplying a direct current to the winding of the electromagnet sufficient to effect actuation of the armature 43 so that it engages the contact 44. Thus the electrode 21 is remotely removed from the circuit and the electrode 19 brought into the recording circuit, without the necessity of removing the electrode tool from the bore hole. Likewise, the effective electrodes may be selected in the form of invention shown in Fig. 3 without withdrawing and re-running of the electrode tool into the bore hole. In this instance, the effective electrodes may be remotely selected by controlling the voltage of the current supplied to the electrodes 18 and 20 merely by adjusting the voltage of the current to the point where the current is sufficient to energize the required relay 42, 43 or 43'', as the cause may be. Likewise, in Fig. 4, the desired electrodes may be rendered selectively effective by the operator through control of the voltage of the current supplied to the electrodes 18 and 20, so that one or the other resistances 52 or 53 effects bypass of current through one or the other of the bridge rectifiers to energize the magnet of the relay switch for that particular bridge circuit.

It is to be understood that the relay switch may be of any type, such as a single pole, single throw, double pole, single throw, double pole, double throw, or a triple pole, single throw, et cetera, depending upon the circuitry desired.

From the foregoing, it is obvious that I have provided a method of and apparatus for electrical logging whereby a plurality of electrodes may be rendered selectively effective while the electrode tool remains in the bore hole, so that there is no necessity of stopping the logging operations, it being only necessary to remotely change the effective relay circuit, thereby eliminating the necessity of withdrawing and re-running the electrode tool into the bore hole.

What I claim and desire to secure by Letters Patent is:

1. In a method of electrically logging a bore hole, the steps consisting of moving current electrodes and a plurality of potential pickup electrodes within the bore hole, supplying an A.C. current to the current electrodes for energizing formations through which the bore hole extends, rectifying a part of the A.C. current used in energizing the formation, establishing a continuity of current with one potential pickup electrode, establishing continuity of current to another of the potential pickup electrodes responsive to flow of the rectified current at a predetermined level of the A.C. current being supplied to the current electrodes, and controlling the voltage of the A.C. current being supplied to the current electrodes to render the rectifying step effective to change from the said one potential pickup electrode to the other potential pickup electrode.

2. In an apparatus for electrically logging a bore hole extending into the earth, a tool, a cable for lowering the tool into the bore hole, a pair of spaced apart current electrodes on said tool, means carried by the cable for supplying an A. C. current to the current electrodes for energizing formations through which the bore hole extends, current rectifying means connected with the said current supply means for rectifying a portion of the current, a plurality of spaced apart potential pickup electrodes carried by said tool, switch means having electrical connections with one and the other of said potential pickup electrodes, an electromagnet for actuating the switch means to render one and the other of the potential pickup electrodes effective, means connecting the current rectifying means with the electromagnet, and means for changing the voltage of the said A.C. current for activating the electromagnet responsive to change in voltage of the said A.C. current for changing connections of the potential pickup electrodes.

3. In an apparatus for electrically logging a bore hole extending into the earth, a tool, a cable for lowering the tool into the bore hole, a pair of spaced apart current electrodes on said tool, means carried by the cable for supplying an A.C. current to the current electrodes to energize formations through which the bore hole extends, rectifiers carried by said tool and having connections therebetween providing a bridge circuit in connection with the current electrodes, a plurality of spaced apart potential pickup electrodes carried by said tool, switch means having connection with one and the other of said potential pickup electrodes, an electromagnet for actuating the switch means to render one and the other of the potential pickup electrodes effective, means connecting output terminals of the bridge circuit with the electromagnet, a resistor in said A.C. current supply and having connection across the bridge circuit, and means for changing the voltage of the said A.C. current for effecting flow of current through the bridge circuit for supplying the D.C. current for activating the electromagnet for changing continuity of current relatively to the respective potential pickup electrodes.

4. In an apparatus for electrically logging a bore hole extending into the earth, a tool, a cable for lowering the tool into the bore hole, said cable including three electrical conductors, a pair of spaced apart current electrodes on said tool and having connection with two of said conductors, means supplying a low voltage A.C. current to said two conductors to energize formations through which the bore hole extends, an electromagnetic switch carried by said tool and having a terminal connected with the other of said conductors, a pair of spaced apart potential pickup electrodes carried on said tool, conductors separately connecting the potential pickup electrodes with separate contacts of said electromagnetic switch, and means for supplying a modified part of the said A.C. current to the electromagnetic switch for effecting actuation of the electromagnetic switch to break electrical continuity with one of the potential pickup electrodes and establishing electrical continuity with the other potential pickup electrode.

5. In an apparatus for electrically logging a bore hole extending into the earth, a tool, a cable for lowering the tool into the bore hole, said cable including three electrical conductors, a pair of spaced apart current electrodes on said tool having connection with two of said conductors, means supplying a low voltage A.C. current to said two conductors, an electromagnetic switch having a terminal connected with the other of said conductors, a pair of spaced apart potential pickup electrodes on said tool, conductors connecting the potential pickup electrodes with separate contacts of said electromagnetic switch, means carried in said tool and in circuit with said two conductors for rectifying a portion of the A.C. current, means for supplying the rectified current to the electromagnetic switch, and means for altering a characteristic of the A.C. current for effecting actuation of the electromagnetic switch to break electrical continuity with one of the potential pickup electrodes and establishing electrical continuity with the other potential pickup electrode.

6. In an apparatus for electrically logging a bore hole extending into the earth, a tool, a cable for lowering the tool into the bore hole, said cable including three electrical conductors, a pair of spaced apart current electrodes on said tool having connection with two of said conductors, a plurality of potential pickup electrodes arranged in pairs on said tool, means supplying a low voltage alternating current to said two conductors, electromagnetic switches having terminals connected with the other of said conductors, conductors connecting the potential pickup electrodes of each pair with separate contacts of one of the eletromagnetic switches, a bridge type rectifier in said tool for each electromagnetic switch and in circuit with said two conductors for rectifying portions of the A.C. current, means connecting said rectifiers with the electromagnetic switches, a resistor bypassing each of said rectifiers and each having a different value, and means for altering the voltage in accordance with the value of the respective resistors for selectively rendering the said rectifiers effective for selectively actuating the switches to change continuity of current to the potential pickup electrodes.

7. In an apparatus for electrically logging a bore hole extending into the earth, a tool, a cable for lowering the tool into the bore hole, a pair of spaced apart current electrodes on said tool, means carried by the cable for supplying an A.C. current to the current electrodes, rectifiers carried by said tool and having connections therebetween forming a bridge circuit in connection with the current electrodes, a plurality of spaced apart potential pickup electrodes carried by said tool and arranged in pairs, a separate switch for each pair of potential pickup electrodes having electrical connections therewith, an electromagnet for each switch, means connecting output terminals of the bridge circuit with the electromagnets, a resistor in parallel with each electromagnet and having a different value, and means for changing the voltage of the A.C. current in accordance with the resistors for activating selectively the electromagnets for changing continuity of current to the potential pickup electrodes.

8. In an apparatus for electrically logging a bore hole extending into the earth, a tool, a cable for lowering the tool into the bore hole, a pair of spaced apart current electrodes on said tool, conductors carried by the cable and connected with the current electrode for supplying an A.C. current, a plurality of potential pickup electrodes arranged in pairs on said tool, an electromagnetic switch for each pair of potential pickup electrodes, a bridge type rectifier in said tool for each electromagnetic switch and in circuit with said current electrodes for rectifying portions of the A.C. current, means connecting said rectifiers with the electromagnetic switches, a resistor bypassing each of said rectifiers and each having a different value, and means for altering the voltage of said current in accordance with the value of the respective resistors for selectively rending the said rectifiers effective for actuating a respective switch to change continuity of current to the potential pickup electrodes.

References Cited in the file of this patent
UNITED STATES PATENTS

| | | |
|---|---|---|
| 2,154,886 | Bachelet | Apr. 18, 1939 |
| 2,255,754 | Beers | Sept. 16, 1941 |
| 2,268,137 | Evjen | Dec. 30, 1941 |
| 2,295,894 | Dewan | Sept. 15, 1942 |
| 2,393,009 | Chun | Jan. 15, 1946 |
| 2,617,852 | Waters | Nov. 11, 1952 |
| 2,728,047 | Doll | Dec. 20, 1955 |
| 2,779,912 | Waters | Jan. 29, 1957 |
| 2,782,364 | Schuler | Feb. 19, 1957 |